UNITED STATES PATENT OFFICE.

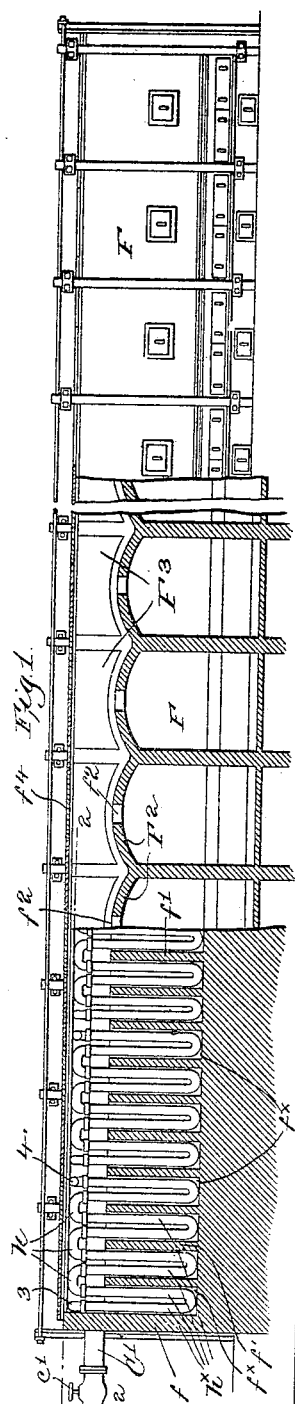
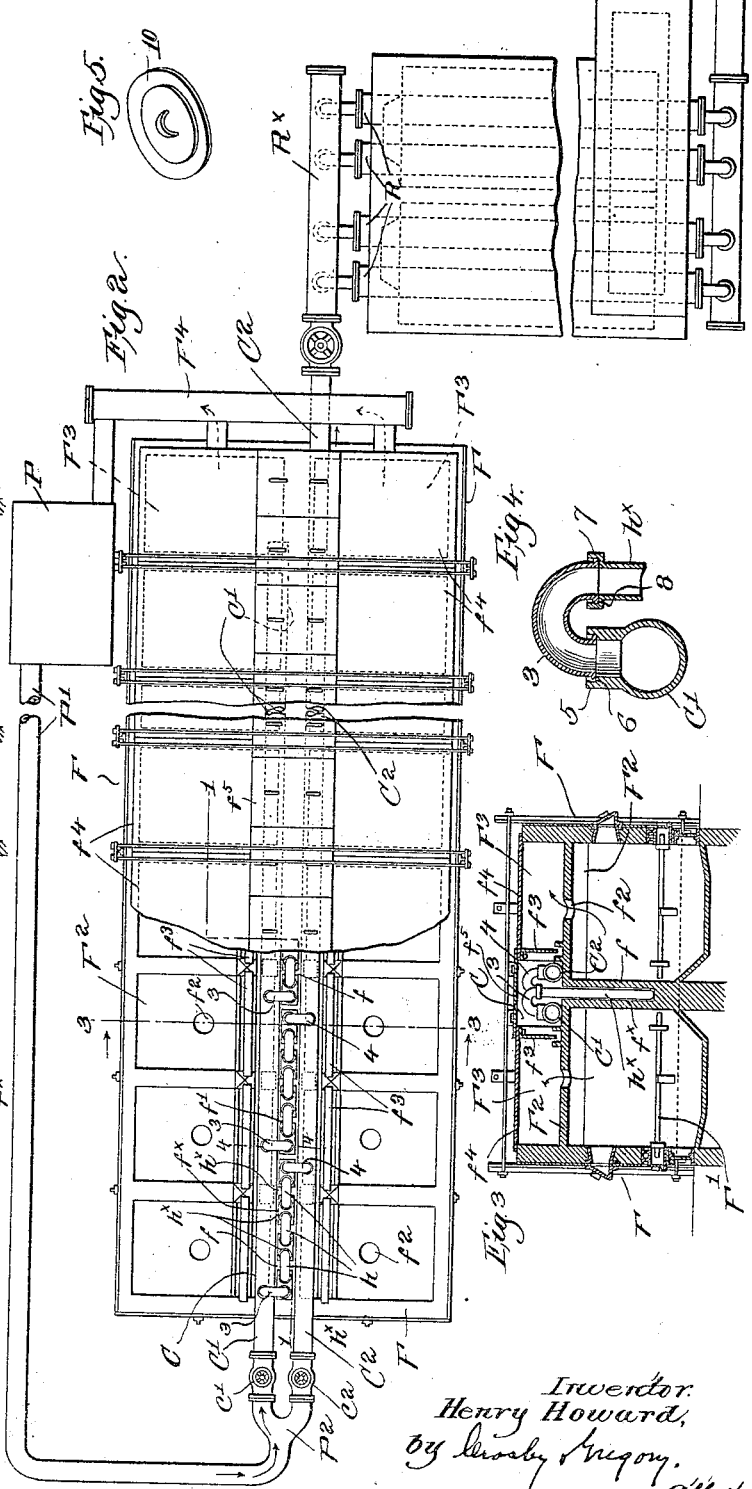

HENRY HOWARD, OF BROOKLINE, MASSACHUSETTS.

REHEATER FOR FURNACE-GASES.

No. 801,318.        Specification of Letters Patent.        Patented Oct. 10, 1905.

Application filed February 3, 1905. Serial No. 243,934.

*To all whom it may concern:*

Be it known that I, HENRY HOWARD, a citizen of the United States, and a resident of Brookline, county of Norfolk, State of Massachusetts, have invented an Improvement in Reheaters for Furnace-Gases, of which the following description, in connection with the accompanying drawings, is a specification, like characters on the drawings representing like parts.

This invention relates more particularly to the manufacture of sulfuric anhydrid and sulfuric acid by the so-called "contact" process, and has for its object the production of novel, convenient, and highly-efficient means for economically reheating the furnace-gases after purification thereof and prior to their introduction to the retorts in which the contact process is effected.

To those familiar with the art it will be understood that the furnace-gases, containing the sulfurous anhydrid and oxygen to be united, are passed through a body of catalytic material; but first such furnace-gases are passed through a cooler and purifier to deprive them of such foreign substances as would by deposition upon the platinized catalytic material otherwise interrupt or objectionably interfere with the catalytic action. A great part of the heat of such gases is abstracted by the purification step, and before their introduction to the contact mass the purified gases must be reheated to the high temperature essential for the satisfactory progress of the catalytic action. It has been proposed to utilize the hot furnace-gases for such reheating of the purified cooled gases by conducting the latter after purification to the contact mass in iron pipes or conduits led through the roasting-furnaces, the very hot gases and products of combustion therein coming into direct contact with the pipes or conduits. This method utilizes, it is true, the heat of the hot and unpurified furnace-gases on their way to the purifier, and thus transfers otherwise wasted heat to the cooled purified gases, bringing the latter to a desirable temperature for admission to the retorts containing the catalytic material. In actual practice, however, this method has not been successfully worked, owing principally to the presence of sulfuric acid in the furnace-gases, which acid condenses on the outside of the reheating-pipes, through which the cool purified gas passes. The deposited sulfuric acid in turn causes flue-dust to stick to the pipes, forming a pasty mass, and finally the pipes become so plastered over that scarcely any heat can be transmitted to their interior. It is also very difficult to regulate the temperature of the purifier gases, due to reheating, and so, too, the warping and distortion of the pipes or conduits exposed to the direct action of the hot gases in the furnaces is a great objection, the piping deteriorating rapidly. Not only that, but inasmuch as the piping is substantially continuous it is impossible to replace or repair any part of the piping while the apparatus is in operation, and when repairs or replacement become absolutely necessary the entire apparatus must be put out of commission.

In accordance with my invention I do not depend upon the waste heat of the furnace-gases for reheating purposes, and consequently I do not need to bring them into contact with the reheating pipes or conduits. As neither the hot furnace-gases nor the flue-dust can come in contact with my reheating-pipes, it will be manifest that they always remain clean and efficient conductors of heat.

In my present invention the reheating temperature is mainly derived from the more or less completely incandescent mass of burning pyrites in the furnace. Any heat which is derived incidentally from the furnace-gases is of so much lower temperature than the incandescent mass that it may be considered as merely reducing loss of heat by radiation which would otherwise occur in certain portions of the apparatus, as will appear hereinafter. Practically all of the effective reheating of the purified gases will be carried out in that portion of the reheating piping which is arranged in close proximity to the incandescent ore or pyrites.

In accordance with my present invention a reheating-chamber is made contiguous to the roasting furnace or furnaces, preferably and conveniently by making a double furnace-wall, and a plurality of reheating units or coils are located therein. These units are so arranged as to convey the purified cooled gases through the reheating-chamber on their way to the contact-retorts, the temperature of the chamber being maintained at a high point, mainly by heat conduction from the incandescent mass of burning ore in the furnaces. Thus the reheating units or coils abstract heat from the mass of burning ore, thereby allowing more ore to be burned in a furnace without overheating, overheating of the ore tending to cause clinkering and sublimation of sulfur, while the reheating-coils are at no time exposed to the direct action of the burning mass of the hot furnace-gases. I am thus enabled to eliminate the warping, distortion, and rapid deterioration of the reheating-piping, prevent the condensation of acid and accumulation of flue-dust, and utilize by conduction the heat of the incandescent ore to reheat the cooled purified gases.

By arranging the reheating-pipes in separate units I am enabled to disconnect or throw out of operation one or more units without any disarrangement of the remainder or without interfering with the operation of the reheater as a whole and without in any way interfering with the regular operation of the furnaces.

The cooled purified gases are led from the purifier into one of two adjacent conduits or mains, which in turn are connected in parallel by the reheater units and conveyed from the second conduit or main to the contact-retorts.

The reheating units or coils are each made up of a plurality of bends connected with each other in series, so that the gases travel in a tortuous path through each unit from the inlet to the outlet conduit or main.

The various novel features of construction, arrangement, and operation embodied in my invention will be fully described in the subjoined specification and particularly pointed out in the following claims.

Figure 1 is a partial front elevation and longitudinal section, centrally broken out, of a row of roasting-furnaces, the section being taken on the line 1 1, Fig. 2, and embodying one form of the reheater in accordance with my present invention. Fig. 2 is a partial top or plan view and horizontal section on the line 2 2 of the furnaces shown in Fig. 1, the connections between the purifier and reheater and between the latter and the retorts being illustrated. Fig. 3 is a transverse section on the line 3 3, Fig. 2. Fig. 4 is an enlarged section on the line 4 4, Fig. 2, showing the detachable connection between the main and a reheater unit; and Fig. 5 is a perspective view of a stopper or closure for use in closing an opening in one of the mains when a reheater unit is disconnected therefrom.

I have herein shown a double row of furnaces F for roasting the pyrites, the furnaces being placed back to back and having a common rear wall $f$, which wall in accordance with my present invention is made double and preferably divided by a series of transverse partitions $f'$, Fig. 1, to form a series of deep chambers or pockets $f^\times$. These chambers are open at their upper ends and extend downward to substantially the level of the grate-bars $F'$ of the adjoining furnaces, as is clearly shown in Fig. 3, so that each chamber has two walls directly interposed between it and the hottest part of the two adjoining furnaces, the burning ore generally being heaped up to the door-level. As a consequence the temperature of the chambers is raised to a high point by conduction of the heat from the incandescent ore in the furnaces, but without any direct action of the heated gases, the chambered wall $f$ rising to the arches $F^2$ of the furnaces.

By the construction described I secure a series of reheating-chambers extending the length of the row of furnaces and highly heated by conductive action of the heat of the burning ore. Through the reheating-chambers the cooled purified gases are conducted by means to be described to take up heat from the chambers, and thereby be reheated to the proper point for admission to the retorts, it being manifest that the heat abstracted from the burning ore is advantageous also in enabling a larger amount of ore to be burned without overheating the furnaces.

The products of combustion pass through openings $f^2$ in the arches to longitudinal flues $F^3$ in substantially well-known or usual manner and are conducted thence through a cooler $F^4$ to the purifier P, Fig. 2, which may consist of one or more towers, scrubbers, or filters, together or separately, as is usual. Longitudinal partitions $f^3$, extended the length of the flues between the arches and the plates $f^4$, forming the flue-tops, are suitably luted by sand or otherwise at their bottom edges and are so disposed as to form a central inclosed chamber or flue C, extending from one to the other end of the row of furnaces, the reheating-chambers $f^\times$ opening into the bottom of the chamber C, as will be clearly seen in Fig. 3. The temperature of said central chamber is maintained at a high point by conduction of heat from the hot and impure furnace-gases traversing the flues $F^3$ through the partitions $f^3$, which conveniently are made of metal plates; but the hot gases are not allowed to enter the flue C, and therefore do not come in contact with the reheating pipes or conduits. The cover-plates $f^5$, which form the top of the inclosed chamber C, are removable, whereby ready access may be had to the said chamber and the reheating-pipes.

The cooled purified gases are discharged from the purifier P through the pipe P' and are forced or drawn through such pipe by a suitable blower or exhauster to a Y, (shown at $P^2$, Fig. 2.) Connected with the branches of the Y are two conduits or mains C' $C^2$, extended in parallelism through the chamber C and suitably supported, one at each side of the upper ends of the reheating-compartments $f^\times$, as shown in Figs. 2 and 3, valves $c'$ and $c^2$, Fig. 2, regulating the flow through the conduits, as will be referred to. The conduit C' is in general an inlet-conduit, as ordinarily the whole or the major portion of the cooled purified gases will pass thereto from the purifier, and the conduit $C^2$ is the outlet-conduit, its far end being in communication with the retorts containing the catalytic material, as will be described, the far end of conduit C' being closed. The conduits are maintained at a high temperature by conduction of heat from the hot furnace-gases as they traverse the flues $F^3$, the side plates $f^3$ preventing any direct impingement of the gases on the conduits.

I have connected the conduits in parallel by a plurality of reheating units or coils, each of the units being made up of several U-shaped bends $h^×$, which depend into the reheating-compartments $f^×$, and herein I have shown each unit as composed of four bends connected in series by inverted bowed coupling members $h$. The number of bends per unit, however, can be varied according to circumstances.

Referring to Fig. 2, it will be seen that the inlet end of each reheating unit is connected by a coupling 3 with the inlet-conduit C', while at its opposite or outlet end the reheating unit is coupled at 4 to the outlet-conduit $C^2$, thereby connecting the conduits in parallel, as stated.

An enlarged view of the detachable coupling is shown in Fig. 4, each conduit having a series of upright nipples 5, internally shouldered at 6 to receive the flanged end of the coupling, as 3, the couplings 4 being made similarly. The upper ends of each bend are enlarged, as shown at 7, providing a seat 8 for the end of the coupling 3 or 4 or for one of the connecting coupling members $h$, as the case may be. The couplings in practice are dropped into place and calked tight with asbestos or otherwise, so that when necessary any reheating unit can be cut out by removing the couplings 3 and 4, connecting it with the conduits, and closing the nipples 5 in the latter by stoppers 10, one of which is shown in Fig. 5.

Any one of the parts or bends $h^×$ of a unit can be removed if worn or broken or for any other reason and a new one inserted by disconnecting the coupling-bends between the part to be removed and the adjacent parts, the bends $h^×$ resting on the bottoms of the compartments or pockets $f^×$.

While the reheating units are maintained at a high temperature mainly by the heat from the burning ore in the furnaces, they are heated solely by conduction, the parts of the wall $f$ which form the sides of the reheating-compartments $f^×$ being interposed between the bends $h^×$ and the hot ore.

By the construction and arrangement described warping, distortion, burning, or other injury of the reheating-piping due to direct action of or contact with the hot furnace-gases is entirely obviated and a very convenient, economical, and efficient reheating apparatus is provided.

The cooled purified gases entering the conduit C' pass in tortuous paths through the various reheating units to the outlet-conduit $C^2$, the connection of the two conduits in parallel producing an outflow of reheated gases of substantially uniform temperature, the right-hand end of conduit $C^2$ (see Fig. 2) communicating by a tube $R^×$, from which the reheated gases pass, to the retorts R, containing the platinized catalytic material or contact mass.

If the action of the reheater is too intense, reheating the purified gases to a higher temperature than is desirable, the valve $c'$ can be partly closed and valve $c^2$ opened somewhat, so that the incoming stream of purified gas is divided, only part passing through the hottest portion of the reheater, the other part, which travels directly through conduit $C^2$, and which is not so highly heated, serving to cool down the streams of reheated gases which pass through the reheating units. Manifestly by proper manipulation of the valves $c'$ and $c^2$ a very accurate regulation of the temperature of the purified gases can be effected and between quite wide limits, while the gases conducted to the retorts will be of substantially uniform temperature of the desired degree.

I have shown one convenient form of apparatus embodying my invention and in connection therewith have illustrated one form of roasting-furnace; but it will be understood that the particular character or construction of furnace and the cooling and purifying means or the catalytic retorts may be of any suitable construction so far as concerns my invention. Accordingly my invention is not restricted to the construction and arrangement just as herein shown and described, as the same may be modified or varied in different particulars by those skilled in the art without departing from the spirit and scope of my invention.

Having fully described my invention, what I claim as new, and desire to secure by Letters Patent, is—

1. In apparatus of the class described, a row of roasting-furnaces, a reheating-chamber contiguous thereto, heated by conduction of heat from the burning ore, two inclosed and continuous conduits extended longitudinally above the reheating-chamber, for the passage of the purified, cooled gases, and a plurality of reheating units connected in parallel with said conduits and extended into the reheating-chamber, whereby the cooled and purified gases pass from the one to the other conduit through said units, to be reheated thereby.

2. In apparatus of the class described, a row of roasting-furnaces, a reheating-chamber contiguous thereto, heated by conduction of heat from the burning ore, two inclosed and continuous conduits extended longitudinally above the reheating-chamber, for the passage of the cooled and purified gases, and a plurality of independent reheating units detachably connected in parallel with said conduits and extended into the reheating-chamber, whereby the cooled and purified gases pass from the one to the other conduit through said units, to be reheated thereby.

3. In apparatus of the class described, a row of roasting-furnaces having a rear wall provided with a plurality of upright compartments open at their upper ends and heated by conduction of heat from the burning ore, two conduits extended longitudinally above the row of furnaces at the top of the rear wall, adapted to convey cooled, purified gases from a purifier to the contact mass, and a plurality of reheating units connected in parallel with said conduits and extended into the heated compartments, whereby the cooled and purified gases pass from one to the other conduit through said units, to be reheated thereby prior to entering the contact mass.

4. In apparatus of the class described, a row of roasting-furnaces having a rear wall provided with a series of deep compartments open at their upper ends, adjacent to and heated by conduction from the burning ore, an inlet-conduit, and an outlet-conduit, extended longitudinally above the row of furnaces adjacent the open ends of said compartments, a plurality of reheating units connected in parallel with said conduits and each consisting of a series of U-shaped members detachably connected at their upper ends and depending into the heated compartments, and a detachable coupling between each unit and each of the said conduits cooled, purified gases admitted to the inlet-conduit passing therefrom through the reheating units to be heated thereby and passing from the said units to the outlet-conduit.

5. In apparatus of the class described, a double row of roasting-furnaces having a common, chambered rear wall, a longitudinally-extended flue above said wall and communicating with the chambered portion thereof, an inlet-conduit and an outlet-conduit, inclosed within the flue, and adapted to be connected respectively with a purifier and a retort containing a contact mass, and a plurality of reheating-coils connected in parallel with the conduits and depending into the chambered rear wall, adjacent to and heated by conduction from the burning ore, the cooled, purified gases passing from the inlet-conduit through said coils to be reheated and passing thence to the outlet-conduit, to be conveyed to the contact mass.

6. In apparatus of the class described, a row of roasting-furnaces, a reheating-chamber contiguous thereto and comprising a series of adjacent deep compartments open at their upper ends and heated by conduction from the burning ore, a plurality of multipart reheating coils or units the parts of each being connected in series, and depending into the compartments, an inlet-conduit and an outlet-conduit, adapted to convey cooled, purified gases from a purifier to a retort, and detachable couplings between said conduits and the reheating-coils, the latter being connected in parallel with the conduits, said conduits being continuous from one to the other end of the reheating-chamber, the cooled gases passing from the inlet-conduit through the reheating-coils to the outlet-conduit and thence to the retort.

7. In apparatus of the class described, a row of roasting-furnaces, a reheating-chamber contiguous thereto, heated by conduction from the burning ore, two inclosed and continuous conduits extended longitudinally above the reheating-chamber, for the passage of the cooled, purified gases, and a plurality of multipart reheating-coils independently connected in parallel with the conduits and extended into said chamber, the parts of each coil being connected in series, the cooled gases passing from the one to the other conduit through the reheating-coils to be reheated thereby.

8. In apparatus of the class described, a row of roasting-furnaces, and reheating-pipes for the passage of the cool, purified gases, said pipes including a plurality of reheating-coils located in close proximity to the mass of burning ore in the furnaces, and heat-conducting protective means interposed between the reheating-coils and the interior of the furnaces, whereby the said coils are protected from contact with the hot gases in the furnaces.

9. In apparatus of the class described, a double row of roasting-furnaces, a common, chambered rear wall, two inclosed main conduits extended longitudinally above said wall, and adapted to conduct cooled, purified gas from a purifying system, and a plurality of reheating units connected in parallel with said conduits and depending within the chambered wall, whereby the cooled, purified gases pass from one to the other of said conduits through the reheating units, to be reheated by conduction of the heat from the burning ore in the furnaces.

In testimony whereof I have signed my name to this specification in the presence of two subscribing witnesses.

HENRY HOWARD.

Witnesses:
   JOHN C. EDWARDS,
   ELIZABETH R. MORRISON.